No. 863,187. PATENTED AUG. 13, 1907.
G. E. KIRK.
ROASTING FURNACE.
APPLICATION FILED JAN. 12, 1906.
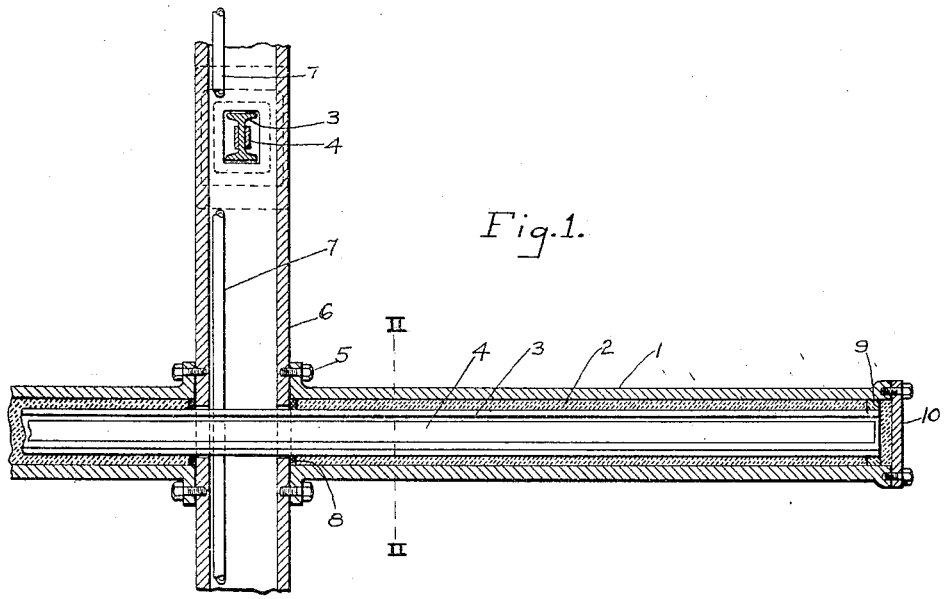
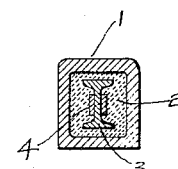
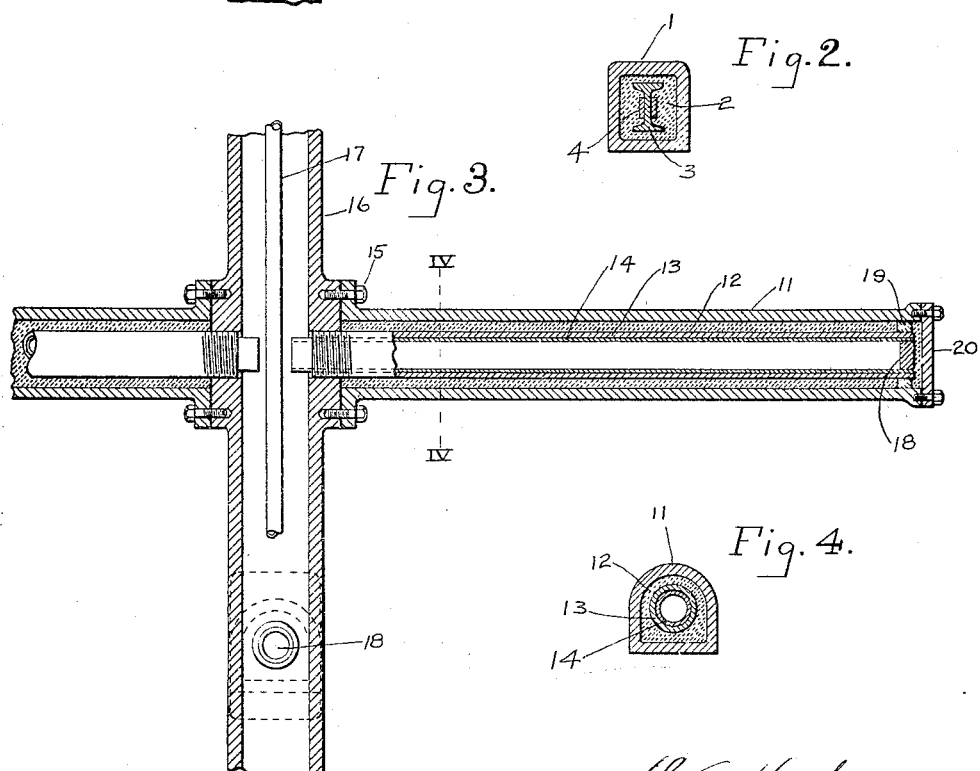
WITNESSES:
Daniel K. Allison
Ella Brickell
G. E. Kirk INVENTOR
BY
G. J. DeWein ATTORNEY.

UNITED STATES PATENT OFFICE.

GEORGE E. KIRK, OF TOLEDO, OHIO, ASSIGNOR TO ALLIS-CHALMERS COMPANY, OF MILWAUKEE, WISCONSIN, A CORPORATION OF NEW JERSEY.

ROASTING-FURNACE.

No. 863,187.

Specification of Letters Patent.

Patented Aug. 13, 1907.

Application filed January 12, 1906. Serial No. 295,719.

*To all whom it may concern:*

Be it known that I, GEORGE E. KIRK, a citizen of the United States, residing at Toledo, in the county of Lucas and State of Ohio, have invented certain new and useful Improvements in Roasting-Furnaces, of which the following is a specification.

This invention relates to stiffening a working member and controlling the temperature thereof.

This invention has utility when used in ore roasting furnaces and comprises efficient means for stiffening the arm. This stiffening is accomplished with the extraction of a minimum amount of heat.

Referring to the drawings: Figure 1 is a partial vertical section of an embodiment of the invention as applied to a roasting furnace. Fig. 2 is a section of the arm on the line II—II of Fig. 1. Fig. 3 is a partial vertical section of another embodiment of the invention as applied to a roasting furnace. Fig. 4 is a section on the line IV—IV of Fig. 3.

Referring to Figs. 1 and 2: the hollow working member or arm 1 is insulated by a packing 2 from the supporting or stiffening member 3. In roasting furnaces and similar structures in which the apparatus disclosed as illustrative of this invention is adapted to be used, high degrees of heat must be withstood by the rabble arms; and as these arms are of considerable length and weight, it is found that the metal of which they are composed, usually cast iron, becomes sufficiently softened by the heat to permit a bending or distortion of the arm. The purpose of this invention is to provide a rabble shaft and its arms with a supporting member which is located within said arms and protected from the heat of the furnace by an insulating packing 2, which packing is for convenience disposed between the interior surface of the arm and the exterior surface of the supporting member. This construction permits the use of a strong supporting member which is to all intents and purposes the arm proper carried by the shaft, while around this arm is a heat insulating packing, and on the outside of this heat insulating packing is the arm 1, which serves to protect the packing and to provide a durable member to which the rabbles proper may be secured. This packing 2 may be a highly refractory substance which is a poor conductor of heat. A cement capable of standing high temperatures, a sand, or other similar substance could be used. Adjacent the stiffening member or support is a good heat conductor 4, as copper. The arm or sleeve 1 is attached by the bolts 5 to the hollow rotatable shaft 6. The temperature of the shaft 6 may be controlled by the circulation of a medium therethrough, which medium could be conducted one way by the pipe 7 in the hollow shaft 6. Should the cooling medium used be a liquid, as water, the supporting member 3 would have tight fit in the shaft 6 by means of a gasket or packing 8. The supporting member 3 may be centered in relation to the sleeve or arm 1 by means of blocks 9 of a non-conducting material, as quartz. The outer end of the sleeve is closed by a plate 10 bolted thereto.

Referring to Figs. 3 and 4: the working arm or sleeve 11 has the non-conductor packing 12 surrounding the stiffening member 13. This non-conductor packing 12 is a poor heat conductor and serves to insulate the support 13 from the sleeve 11. Adjacent the stiffening member 13 is the heat conductor 14. The arm 11 may be attached by bolts 15 to the hollow rotatable shaft 16. In this hollow shaft 16 is a pipe 17 affording means for the circulation of a medium therethrough for controlling the temperature of the shaft and arms. In the ends of the stiffening member 13 are plugs 18, the one at the inner end serving to keep out water, it such liquid be used as the circulating medium. The stiffening member 13 may be braced or centered as to the sleeve or arm by wedges or blocks 19, which blocks or wedges may be of a highly refractory non-conducting material, as quartz. The outer end of the arm is closed by a cap 20 bolted thereto.

What is claimed and it is desired to secure by Letters Patent is:

1. A temperature controlled shaft, an arm, a support for the arm, and a heat conductor for the support.

2. A temperature controlled shaft, an arm, and an insulated support for the arm.

3. The combination with a shaft, of a supporting member supported by and extended from said shaft, a hollow arm inclosing said supporting member, and a heat insulating packing interposed between the interior surface of said arm and said member.

4. The combination with a shaft, of a supporting member supported by and extended from said shaft, a hollow arm secured to said shaft and inclosing said supporting member, and a heat insulating packing interposed between the interior surface of said arm and said member.

5. The combination with a hollow shaft adapted to receive a fluid temperature controlling medium, of a supporting member supported by and extended from said shaft, a hollow arm, and a heat insulating packing interposed between the interior surface of said arm and said member.

6. The combination with a hollow shaft adapted to receive a fluid temperature controlling medium, of a supporting member supported by and extended from said shaft, a hollow arm, a heat insulating packing interposed between the interior surface of said arm and said member, and a heat conductor in close proximity to said support within said arm, said heat conductor being extended into the path of the current of temperature controlling fluid which may be circulated within said shaft.

7. The combination with a hollow shaft adapted to receive a fluid temperature controlling medium, of a supporting member supported by and extended from said shaft, a hollow arm, a heat insulating packing interposed between the interior surface of said arm and said member, a heat conductor in close proximity to said support within said arm, said heat conductor being extended into the path of the current of temperature controlling fluid which may be circulated within said shaft, and means to prevent said fluid contacting with said insulating packing.

In testimony whereof I affix my signature in presence of two witnesses.

GEO. E. KIRK.

Witnesses:
G. F. DE WEIN,
ELLA BRICKELL.